UNITED STATES PATENT OFFICE.

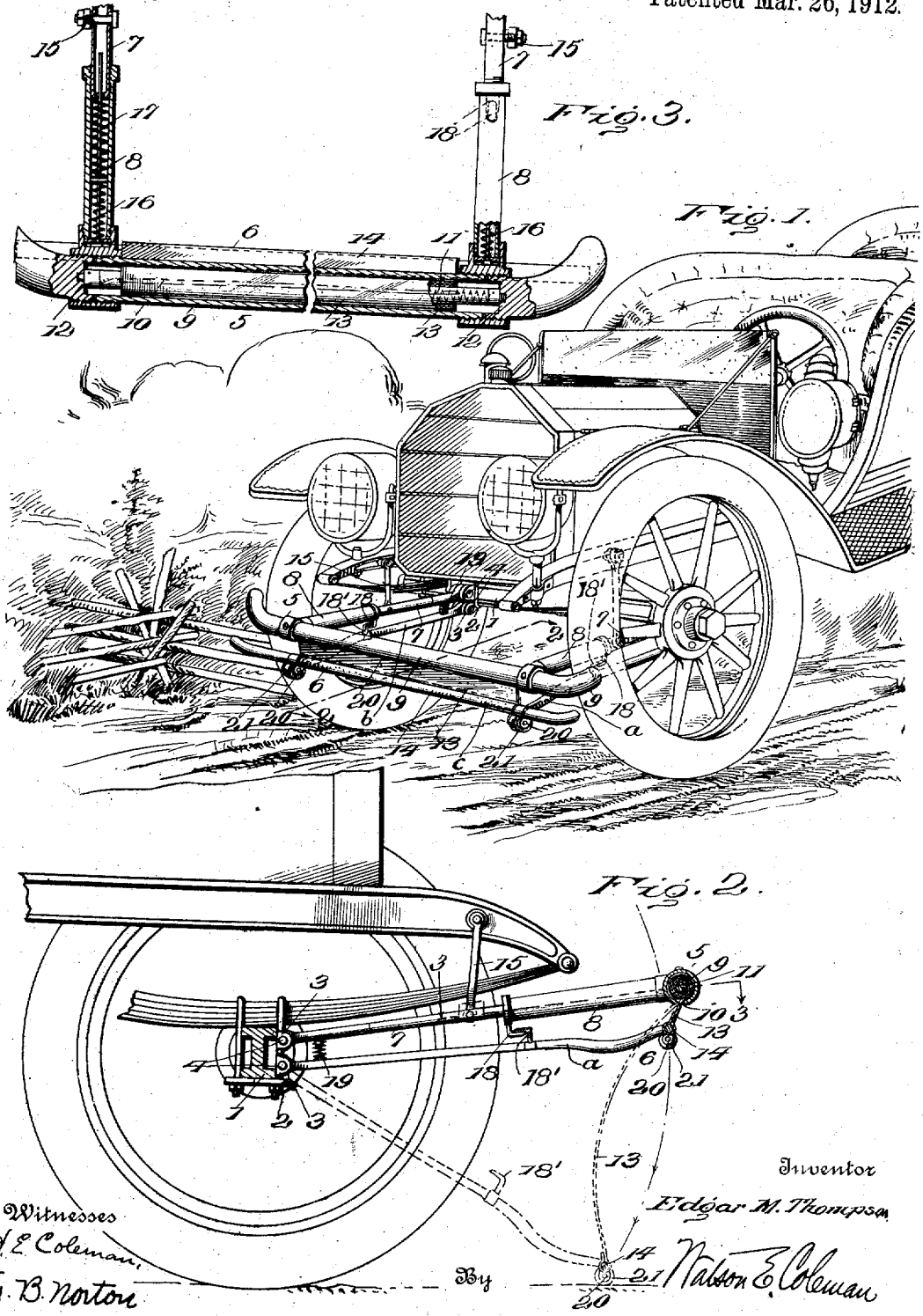
E. M. THOMPSON.
VEHICLE FENDER.
APPLICATION FILED NOV. 8, 1911.
1,021,435.  Patented Mar. 26, 1912.
Inventor
Edgar M. Thompson
Witnesses
H. E. Coleman
G. B. Norton
By Watson E. Coleman
Attorney

EDGAR M. THOMPSON, OF RICHMOND, INDIANA.

VEHICLE-FENDER.

1,021,435.  Specification of Letters Patent.  Patented Mar. 26, 1912.

Application filed November 8, 1911. Serial No. 659,107.

*To all whom it may concern:*

Be it known that I, EDGAR M. THOMPSON, a citizen of the United States, residing at Richmond, in the county of Wayne and State of Indiana, have invented certain new and useful Improvements in Vehicle-Fenders, of which the following is a specification, reference being had to the accompanying drawings.
This invention relates to new and useful improvements in vehicle fenders, and more particularly to a fender adapted for use on automobiles and has for its object the production of a fender of this class which can be attached to any vehicle and which provides for automatically releasing a portion of the fender when striking a person or object in the path of the vehicle, so as to prevent the person or object struck from coming in contact with the wheels of the vehicle.

Another object of the invention is to provide a device of this character which will possess advantages in points of efficiency and durability, is inexpensive of manufacture and at the same time is simple in construction and operation.

With the above and other objects in view the invention consists in the novel features of construction and the combination and arrangement of parts hereinafter more fully described, pointed out in the claims and shown in the accompanying drawings, in which, Figure 1 is a perspective view of the forward end of an automobile showing my improved fender applied thereto; Fig. 2 is a sectional view on the line 2—2 of Fig. 1; Fig. 3 is a sectional view on the line 3—3 of Fig. 2.

Referring more particularly to the drawings 1 indicates the front axle of an automobile having the straps 2 mounted thereon. Ears 3 are formed integral with said straps. Disposed between said ears and secured by means of the bolts 4 are the inner ends of the fender, said fender comprising an upper frame 5 and a lower frame 6, said lower frame comprising the two longitudinal side bars *a* and *b* having their outer ends connected by the cross bar *c* and their inner ends pivotally connected to the straps 2 on the axle. The upper frame is composed of the longitudinal telescoping bars 7 and 8 and a transversely disposed fender bar 9 secured to the outer end of the bars 8, said fender bar being provided with a centrally arranged longitudinal opening in which is disposed a spring roller, said roller having each end mounted in the bearings 12 disposed at each end of the opening. Mounted on the spring roller 11 and having one end disposed through the slot 10 in the lower side of the fender bar is a roll of canvas fabric 13, the end of said canvas being secured to the forward transverse bar 14 of the lower frame 6. The upper frame 5 is supported by means of the hangers 15, each having one end pivoted to the frame of the automobile and the other end pivoted to the bars 7. The bars 7 are adapted to telescope within the bars 8 and two sets of coil springs 16 and 17 are arranged in the bars 8 and disposed between the end of the bars 7 and the fender bar 4. The springs 16 are somewhat smaller than the springs 17 so that when an object strikes the fender bar it will force the bars rearwardly thus releasing the catches 18 and 18' which are secured to the bars 8 and the lower frame 6, respectively, and said lower frame will be forced downwardly by means of the heavy coil springs 19 disposed between the two frames at their inner ends. When the lower frame is forced downwardly the canvas 14 will be unrolled so that the person or object struck will fall against the same and be prevented from coming in contact with the wheels of the vehicle.

Bearings 20 are secured to the underside of the lower frame 6 and hard rubber wheels 21 are mounted therein adapted to keep said lower frame off of the ground when in a lowered position.

It will be seen that the springs 17 in the bars 8 are somewhat stiffer than the springs 16 so as to prevent or weaken the shock when the fender bar 9 strikes an object.

When the fender bar 9 comes in contact with a person or other object in the path of the vehicle, the bars 8 are forced rearwardly thus releasing the catches 18 and 18' and allowing the lower frame 6 to be forced downwardly by means of the coil springs 19. By this operation the canvas 14 will be unrolled from the roller 11 so that the person or object struck will fall against the canvas and be prevented from coming in contact with the wheels of the vehicle. To place the lower frame in position again it is lifted up, and by pressing inwardly on the fender bar 9 the catches 18 and 18' will engage to hold the lower frame in position, when the canvas 14 will be rolled up by means of the spring roller, thus placing the fender in position so that the vehicle may continue on its way.

While I have shown and described the preferred form of my invention it will be obvious that various changes in the details of construction and in the proportions may be resorted to for successfully carrying my invention into practice without sacrificing any of the novel features or departing from the scope thereof.

Having thus described the invention, I claim:

1. In a vehicle fender, the combination of an upper frame supported in a substantially horizontal position and a lower frame pivotally secured at its inner end and adapted to swing downwardly from its unreleased position, said lower frame being normally disposed in a substantially horizontal plane, catch members carried by said frames and adapted to engage one another to hold said lower frame in a normal position, said upper frame comprising longitudinal telescoping side bars and a transverse fender bar, coil springs disposed in one section of said side bars and engaging one end of the other section and the fender bar, and means for forcing said lower frame downwardly when an object strikes the fender bar and releases said catch members.

2. In a vehicle fender, the combination of an upper frame supported in a substantially horizontal position and a pivoted lower frame adapted to swing downwardly from its unreleased position and normally disposed in a substantially horizontal plane, catch members carried by said frames and adapted to engage one another to hold said lower frame in a normal position, said upper frame comprising longitudinal telescoping side bars and a transverse fender bar, coil springs disposed in one section of said side bars and engaging one end of the other section and the fender bar, said fender bar having a longitudinal opening formed therein, said fender bar having a longitudinal slot formed in the lower side thereof and communicating with said opening, a spring roller disposed in said opening, a roll of canvas mounted on said roller and having one end disposed through said slot and secured to the lower frame, and means for forcing said lower frame downwardly when said fender bar strikes a person or object and releases said catch members.

3. In a vehicle fender, the combination of an upper frame supported in a substantially horizontal position and a pivoted lower frame adapted to swing downwardly from its unreleased position and normally disposed in a substantially horizontal plane, hangers having one end pivoted to the frame of the vehicle and the other end pivoted to said upper frame to support the same, catch members carried by said frames and adapted to engage one another to hold said lower frame in a normal position, coil springs disposed between said frames near their inner ends and adapted to force said lower frame downwardly when said catch members are released and means carried by said upper frame and secured to the outer end of the lower frame adapted to form a barrier between the wheels of the vehicle and the person or object struck when said lower frame is in its lowered position.

In testimony whereof I hereunto affix my signature in the presence of two witnesses.

EDGAR M. THOMPSON.

Witnesses:
 LAYTON MYRICK,
 FRITZ K. HOHENSTIEN.

---

Copies of this patent may be obtained for five cents each, by addressing the "Commissioner of Patents, Washington, D. C."